United States Patent [19]

Ryan

[11] 4,411,073
[45] Oct. 25, 1983

[54] PITCH TESTING APPARATUS

[76] Inventor: Terence J. Ryan, 39 Egerton St., Southport, Queensland, Australia, 4215.

[21] Appl. No.: 282,508

[22] Filed: Jul. 13, 1981

[30] Foreign Application Priority Data

Jul. 11, 1980 [AU] Australia ............................. PE4485

[51] Int. Cl.³ ............................ G01B 5/24; G01B 7/30
[52] U.S. Cl. .................................................. 33/174 C
[58] Field of Search ............. 33/1 PT, 125 C, 172 E, 33/174 C, 174 P, 179.5 R

[56] References Cited

U.S. PATENT DOCUMENTS

| | | | |
|---|---|---|---|
| 1,021,797 | 4/1912 | Rice | 33/174 C |
| 1,902,180 | 3/1933 | Prior | 33/174 C |
| 2,096,752 | 10/1937 | Metcalf | 33/174 C |
| 2,248,973 | 7/1941 | Eby | 33/174 C |
| 2,550,707 | 5/1951 | McKinstry et al. | 33/174 C |
| 2,717,453 | 9/1955 | Wildt | 33/174 C |
| 2,788,519 | 4/1957 | Caldwell | 33/125 C |
| 2,865,103 | 12/1958 | Lolley et al. | 33/125 C |
| 2,941,301 | 6/1960 | Wright | 33/174 C |
| 3,482,321 | 12/1969 | Inshaw | 33/125 C |
| 3,924,337 | 12/1975 | Taylor | 33/172 E |
| 4,035,922 | 7/1977 | von Voros | 33/125 C |
| 4,056,888 | 11/1977 | Hughey, Jr. | 33/174 C |

FOREIGN PATENT DOCUMENTS

| | | | |
|---|---|---|---|
| 844215 | 7/1952 | Fed. Rep. of Germany | 33/174 C |
| 866386 | 2/1953 | Fed. Rep. of Germany | 33/174 C |
| 29049 | 9/1918 | Norway | 33/174 C |
| 129097 | 7/1959 | U.S.S.R. | 33/174 C |

*Primary Examiner*—Richard R. Stearns
*Attorney, Agent, or Firm*—Bacon & Thomas

[57] ABSTRACT

An instrument for measuring the pitch of propeller blades which includes a probe which can contact and remain in contact with a propeller blade while there is continuous relative rotation of the probe and the blade, there being means to measure the degree of angular rotation and the distance of movement of the probe and means whereby the two parameters can be manipulated to provide a measurement of pitch.

The applications shows several forms of instrument to effect this result under different circumstances.

12 Claims, 7 Drawing Figures

PITCH TESTING APPARATUS

This invention relates to a pitch testing instrument and, in particular, to an instrument for testing and indicating the pitch of propeller and, particular, for propeller blades for boats.

Both during manufacture and at other times during the life of the propeller, it is desirable to know the pitch of propellers and to be able to compare the pitch of various blades of a single propeller.

Normal propellers have between two and six blades and, depending on the particular design, the pitch of each blade at equal distances from the axis of the propeller can vary across the blade and, depending upon the particular propeller, the pitch of the blades may vary along the radius of each blade.

Previous methods of testing the pitch of propellers have been relatively time consuming, normally of only fair accuracy.

One particular form of pitch measuring device comprises a quadrant including a required included angle having apertures at various radial spacings, the arrangement being such that pins can be passed through a pair of apertures at any particular radial spacing and separated by the required angle, which pins are permitted to contact the surface of the propeller and, whilst the quadrant is in a plane normal to the axis of the propeller, the difference in the heights of the two pins as they extend through the quadrant is ascertained and this height gives an indication of the partial pitch for the angle measured and the total pitch can be calculated by proportioning the height over 360°, that is over one full turn of the propeller.

Another previous form of pitch measuring instrument included a beam which was adapted to lie across the face of a propeller blade and from which the mean angle of the propeller blade could be calculated and from this measurement an estimate of mean pitch obtained.

A further method, which can be considered a modification of the above, provides a beam above the propeller which supports a sliding probe parallel to the propeller axis. The probe shaft position is noted from a reference point, the propeller is rotated the desired number of degrees and the probe shaft travel is multiplied by 360 and then divided by the angle rotated which gives inches pitch. This method tends to introduce inaccuracies caused by mechanical clearance and shaft flexing and care must be taken to minimise these.

A further method which could be used to obtain the pitch can be obtained by using a dial indicator adapted for controlled movement in a plane normal to the axis of the propeller.

It is the object of the invention to provide an instrument by means of which the pitch of a propeller blade can be readily and accurately ascertained and which is more flexible than previously known methods.

It is a further object to use the instrument to provide measurements of propeller parameters which enables various characteristics of the propeller to be obtained.

A still further object of the invention is to provide a method of measuring the pitch of propeller blades using the instrument referred to hereinafter.

The instrument includes a probe adapted to be brought into contact with and remain in contact with a propeller blade at a fixed radial distance from the centre of the blade, means whereby the probe and propeller may be rotated, one relative to the other, and means associated with the probe or the propeller whereby the amount of relative angular rotation can be ascertained, means adapted to ascertain vertical movement of the probe between predetermined positions of angular rotation, whereby the movement of the probe normal to the blade between the predetermined positions of angular rotation can be used as operators to provide a direct reading of the pitch of the particular blade at the radial spacing at which the probe is located over the part of the blade traversed by the probe.

In certain forms of the instrument the propeller can be mounted on the instrument for rotation above a substantially vertical axis and the amount of rotation of the propeller can be ascertained electronically or by means of a mechanical measuring system, such as by the use of a calibrated worm and worm wheel drive or a spur gear drive which can be driven at a more or less steady speed and which is provided with means whereby rotation can be measured.

In another form of instrument the probe can be mounted on a frame adapted to be mounted relative to the propeller whilst the propeller is still on its shaft and means are provided to maintain the probe against the propeller at a relative constant force.

It still another form of instrument, the probe can be carrier on a carrier which can either be mounted on the propeller or on which the propeller can be mounted, in the first arrangement the carrier can be rotated relative to the propeller and in the second the propeller is rotated relative to the carrier.

In each form of the instrument of the invention, one aspect is critical and this is there is a steady motion of the probe relative to the blade, when the probe is in contact with the blade. This motion tends to place the probe under load whilst measurements are being taken and we have found that this effectively locates the probe in a constant position relative to the remainder of the instrument at all times and permits accurate reproducibility of results and an accurate indication of the pitch of the propeller being measured.

The instrument of the invention may include means whereby independent readings can be taken for each blade of the propeller with the reading indication being reset after the required reading of each blade.

In order that the invention may be more readily understood, we shall describe several embodiments of the invention in relation to the accompanying drawings, in which.

In order to calculate the pitch of a propeller, it is necessary to provide an indication of the rotation of the propeller and the variation in height, or in some conventions drop, of each blade over a predetermined degree of rotation.

In order to achieve this, it is first necessary to arrange to have the propeller or the measuring device selectively rotated about a fixed axis over a predetermined angle.

Figure 1:
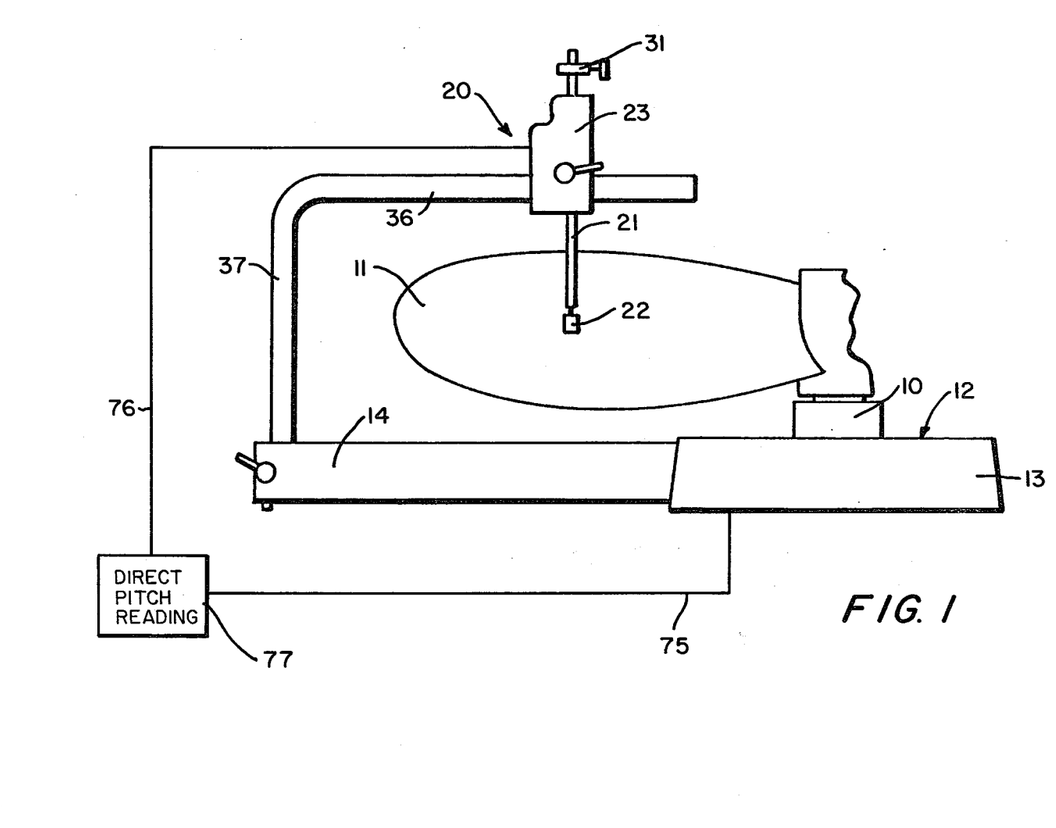
FIG. 1 is a side elevation of a first form of instrument designed for use with relatively small propellers.
Figure 2:
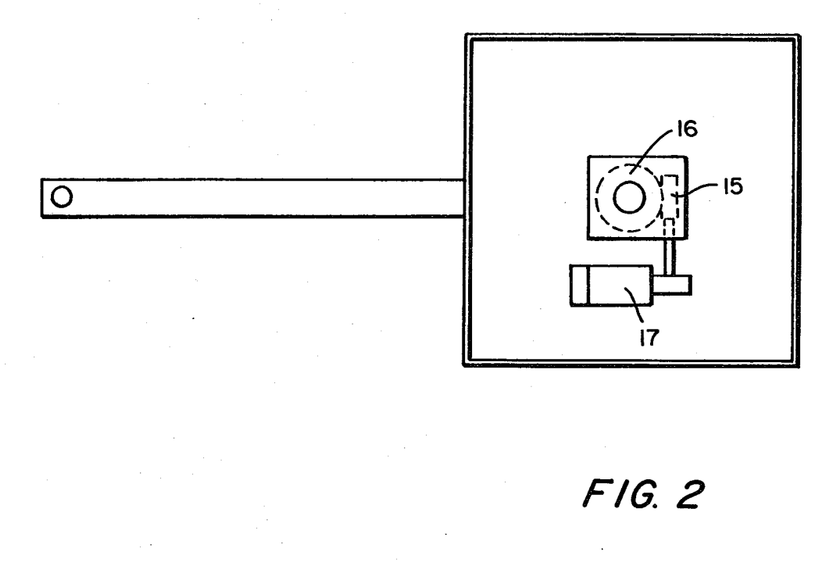
FIG. 2 is an underneath view of the instrument of FIG. 1 showing the drive means whereby rotation of the propeller is provided.
Figure 3:
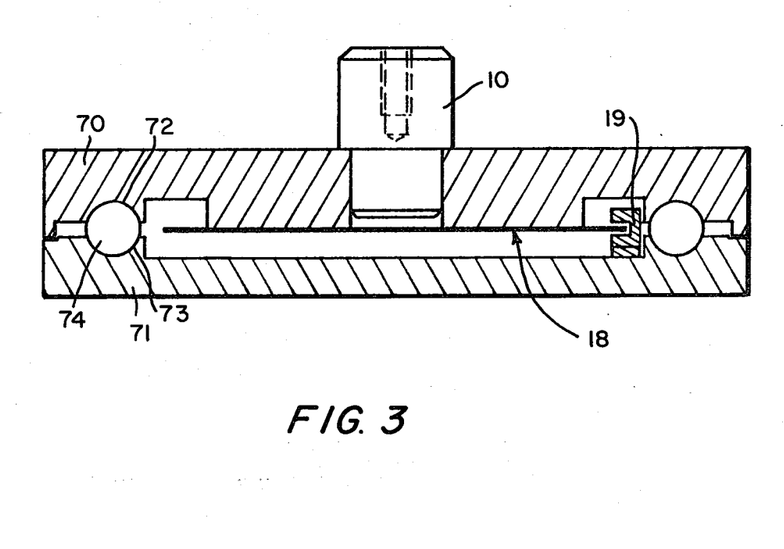
FIG. 3 is a sectional side elevation of a different arrangement showing an optical way of measuring the rotation of the propeller which can be applied to the instrument of FIG. 1.

We shall initially describe the way in which this is achieved in relation to FIGS. 1 to 3 but, before doing this, believe it desirable to consider, generally, the situation with regard to propellers and the application of the invention. Propellers vary greatly in size, those used in small outboard motors can be as little as 8 to 10 centimeters in diameter, whilst those used in large commercial and naval vessels can be many meters in diameter. Whereas smaller diameter propellers are easy to handle, either by individuals, by a fork lift truck or by a crane to locate for testing, handling of large propellers is a major operation. Further, it is often difficult to ensure that a propeller is correctly located on its shaft and, where a large propeller is concerned, it is undesirable to remove the propeller unless essential.

For these reasons, one form of instrument described later herein is specifically suitable for use with large propellers is adapted for use with the propeller still attached to its shaft.

Figure 4:
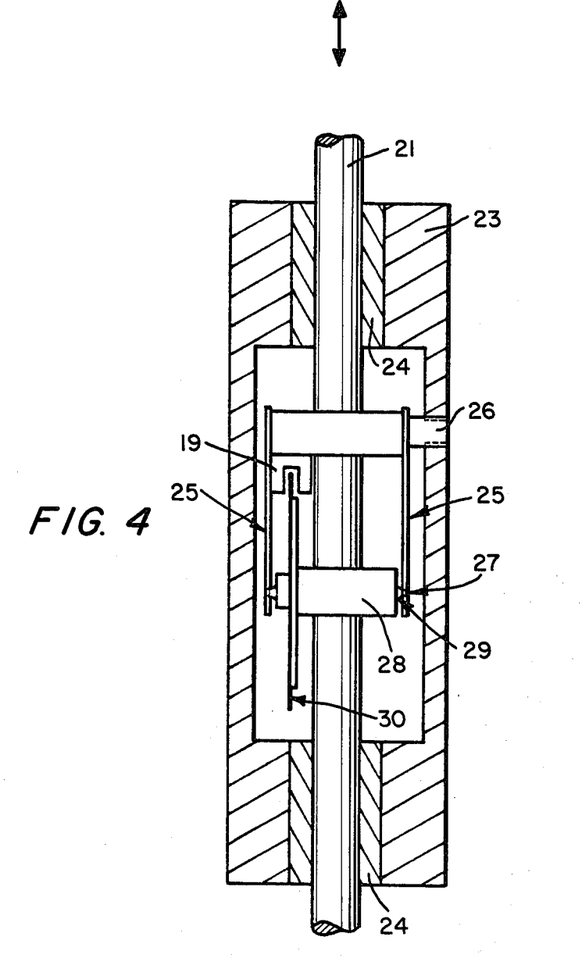
FIG. 4 is a view showing the arrangement of the sensing means used in association with the probe to give an indication of the vertical location of the probe.

However, the basic principle of operation of such instrument is identical to the type used for smaller propellers and, for simplicity, we shall originally discuss the basic form of instrument illustrated in FIGS. 1, 3 and 4 and this instrument in association with the optical way of measuring the rotation of the propeller of FIG. 3 which will largely lead a person skilled in the art to understand the application of the concept to the various types of instrument.

For small propellers we prefer to rotate the propeller about a fixed axis and this is most readily achieved by providing a spindle 10, which may be an upwardly directed spindle on which the propeller 11 is mounted.

The spindle 10 extends upwardly from a base 12 which, as illustrated, has a body portion 13 and a neck 14 extending outwardly therefrom. This particular arrangement is provided to receive propellers up to a maximum size, which is restricted by the length of the neck. The actual size can readily be scaled up to whatever is required, taking into account the necessary rigidity needed to locate the probe 20 for vertical movement which can be accurately measured, as will be described hereinafter, and the necessity that the propeller be arranged for rotation.

The spindle 10 is provide with rotational means which, as illustrated in FIG. 2, can relatively simply be a worm 15 and worm wheel 16 with the worm being driven by an electric motor 17.

This motor whilst driving the propeller 11 does not have to be a constant speed motor as the angular displacement of the propeller is not gauged directly from the operation of the motor, but it is preferred that the motor operates continuously whilst measurements are being made, as will be discussed hereinafter.

In an even simpler form, not illustrated, the worm shaft may be extended beyond the base and be provided with a handle or the like, whereby rotation of the propeller can be directly effected by an operator.

As it is necessary to have an accurate indication of the angular displacement of the propeller, means to ascertain this are provided.

This may be done in several ways. In one simple form it may be preferred that the various displacements be of multiplies of 5° and may well be of multiples of 15°. In this arrangement the operation of the worm, either by motor 17 or otherwise, can cause the provision of a signal at, say, every 5° or multiple thereof of movement of the propeller. The signal can be provided by a mechanical sensor or electrically or electronically.

In another form, and as illustrated in FIG. 3, we may provide a more versatile means which comprises the provision of a graticule 18 having, about its periphery, 360 equally spaced radial bars and 360 radially spaced transparent slots between the bars. Such a graticule can easily be produced in an enlarged form and photographically reduced to provide a relatively small diameter graticule which, as illustrated, is located coaxially with the spindle 10 on which the propeller 11 is to be mounted or otherwise located for rotation at a predetermined ratio relative to the spindle 10.

A caliper 19 is provided on each side of the graticule 18, on one side of which caliper there may be a light source and on the other a light sensitive diode or the like, so that as the graticule is rotated, pulses are produced with, in the described case, one pulse being produced for each degree of revolution of the propeller shaft.

As will be described later in relation to other embodiments of the invention, whilst the concept of using a graticule, such as graticule 18, is satisfactory for direct association with the spindle when the propellers to be tested are relatively small, it may not be feasible where substantially larger propellers are used.

In these cases, it is still possible to use a graticule to provide a signal dependent on the rotation of the spindle, or the instrument relative to the propeller. If a graticule is used it would normally be driven from the spindle, or some rotating component, either directly or so as to be proportional to the rotation of the propeller.

Alternatively the indication can be obtained in some other way.

These may include the provision of an apertured disc on a slow moving part of the mechanical drive, the aperture(s) in the disc permitting the passage of light from one side of the disc to the other, and thus providing a pulse of light which can be detected by a light sensitive device. If, for example, we use a worm and worm wheel having a ratio of 30:1, and a disc having 12 apertures is associated with the worm, there will be one pulse per degree of rotation of the worm wheel and, thus, the propeller.

The ratio and the number of apertures in the disc can be varied to accommodate the form of drive needed for propellers of different sizes and weights and to provide the accuracy of measurement of angular displacement required. If a spur gear train is used a similar method of measurement can be used in association with one of the gears of the train.

Another of these is by direct measurement of the rotation of the motor which drives the shaft and using this to provide the required information.

As the mass of the propeller to be rotated increases the efficiency and accuracy of drive by a worm and worm wheel decreases as there can be a "winding-up" and "unwinding" of the worm as the load is applied and released.

For these applications we prefer to use a spur gear drive which does not suffer from this disadvantage.

The other essential part of the instrument of the invention is a probe 20 which is adapted to be brought into contact with a propeller blade and which moves vertically on relative rotation of the probe and the propeller blade, the degree of movement depending upon the formation of the propeller blade.

In its broadest sense, the instrument is adapted to measure this vertical movement over a predetermined angular rotation of the blade and from these two parameters the pitch of the blade, at least over the angle measured, can be ascertained.

In the illustrated form, the probe 20 includes a shaft 21 which has a roller 22 or other low friction means which contacts and moves over the blade attached to its lower end.

The shaft 21 passes through a housing 23 in which there are located journals 24, shown in FIG. 4, the journals constraining the shaft 21 for axial movement relative to the housing.

Located in the housing are a substantially parallel pair of arms 25, which are mounted on a pivot 26 adjacent one end, the arms being spring loaded to be biassed towards the shaft 21. Adjacent their ends away from the pivot 26 the arms have apertures 27 and between these apertures 27 is located a roller 28 having conical ends 29 adapted to enter the apertures 27.

This arrangement is such that the roller 28 is held against the shaft 21 and is rotated by axial movement thereof relative to the journals 24.

The arrangement is such as to be self compensating for wear as should the aperture 27 in the arms 25 wear, and they are deliberately made of metal softer than the ends 29 of the roller 28 then the ends 29 effectively cut a slot in the arms and the roller 28 is held by a substantially constant force against the shaft 21.

Mounted on the roller 28, adjacent one side thereof, is a graticule 30 which can be formed in the same way as the graticule 18.

Alternatively, and should it be desired, the shaft 21 may have teeth thereon which mesh with a gear located therebeside and adjacent the end of a roller so that there is positive location between the shaft and the roller so that the roller rotates with the shaft. In this case the graticule 30 is located on this roller.

The graticule 30 which in the preferred form may have 240 bars for the equivalent of one inch vertical travel of the probe but, as will be described later, the associated counting and calculating circuitry can be provided with a multiplying factor which can compensate for variations in this. Practically, it may be satisfactory to have a different number of bars, say 300 bars, about the periphery of this graticule but with the rotation of the graticule being less than one full turn for a one inch movement of the probe. This, of course, is dependent on the diameter of the roller 28 or the number of graticules on the gear.

The shaft 21 of the probe may also be provided with a height adjustment means, such as an adjustable collar 31 thereabout above the upper journal 24, so that the maximum downward travel of the probe is controlled and can be adjustable, the normal adjustment being such that when the propeller is positioned the roller 22 on the lower end of the probe when between two blades can strike the leading edge of the propeller blade and can pass on to the body of the blade.

Whilst in the light form of instrument illustrated in FIGS. 1 to 4 the probe can be permitted to drop freely and in any form the probe must be able to rise freely with minimum resistance so as to quickly and accurately follow the surface of the blade, where a heavier probe is to be used, it is desirably and may necessarily be damped, as by an air damper which would restrict rapid movement but not have any adverse effect on slower movement.

It will of course be appreciated that as the propeller or the instrument is rotated so as the probe reaches the trailing edge of each blade it will drop to its initial condition ready to pass onto the next blade.

Where the probe becomes heavy, as for a probe to be used on a large propeller, it may, in fact, be desirable to counterweight the probe to effectively limit the downward force and to control its downward movement. Such an arrangement can be most desirable in providing a probe which is not to be used, at all times, in a vertical mode. In such a case the counter weight can be arranged to act against the weight of the probe to limit the downward force or could be arranged to provide an inward force if the probe is to be used, say, horizontally. Such an arrangement is shown for counter weight 43 in FIG. 5, which will be described further hereinafter.

The housing 23 is preferably provided with an aperture, not shown, through which can pass a shaft 36 which is radial to the spindle 10 and which, itself, if required, can move vertically on another shaft 37 to provide height adjustment for different sized propellers.

In the general operation of the instrument of the invention and specifically the embodiment of FIGS. 1 to 4, it is first necessary to calibrate the probe and in order to do this, it is necessary to physically cause the probe to be moved vertically a predetermined distance, such as one inch, and to ensure that the output gives a predetermined number of pulses or to ascertain the number of pulses.

It is not proposed in this specification to describe specific electronic circuitry to provide the desired output indication as it will be appreciated that the required results can be obtained in many different ways and a competent electronics engineer or designer could readily produce an substantial number of circuits which would be satisfactory.

There are two things which need to be manipulated, an output 75 obtained from the rotation of the propeller and the output 76 obtained from the movement of the probe.

In the simplest case, where a propeller is of a fixed pitch, it is only necessary to divide the height moved by the probe by the angular displacement and multiply the result by 360°. Basically the illustrated embodiment is arranged to provide at any radius a direct pitch reading 77 for each predetermined angular displacement, which can then be charted to show change of pitch, if the propeller is a variable pitch propeller, distortion, either from an indication of change if the propeller is a constant pitch propeller or by unexpected change if the propeller is a variable pitch propeller, an indication of where, along the blade there is distortion, and a means of ensuring that the various blades of a particular propeller are effectively the same.

In a more sophisticated application of the invention, the movement of the probe over a predetermined angular rottion can be determined and stored. Preferably, the movement of the probe over each degree of movement would be preferred.

The information achieved could then be directly printed out or otherwise displayed to give a contour of the propeller, either in figures or by graphical representation, at a particular radius, or the figures can be used to provide calculations of pitch at different positions.

Such information could readily be stored by a computer, such as on a floppy disc and could be maintained so that if the same propeller is later measured, variation could be ascertained.

We stress that whilst different forms of information manipulation are of great value to the invention, these are only part of the invention in associated with the instrument of the invention or the method of use of the instrument.

Returning to the embodiment of FIGS. 1 to 4, if a propeller has, say, a twenty-four inch pitch, the probe should move one inch in every 15° of travel of the propeller and, thus, for calibration purposes for direct reading, using the desiderata set out above, the pulse count should be 240, for a one inch vertical movement.

In order to calibrate to this, we can provide an electronic circuit arrangement which has, interalia, a power supply to cause operation of the motor and circuits in association with each graticule or other measuring means to provide the required outputs. The circuit may include a binary switch which has three components, one of which reads 9 and the other two can be arranged to read at anything from 0 to 9, the arrangement being that the number of pulses received from the graticule 30 can be multiplied by anything from 900 to 999 so that the output can be exactly that required to provide a direct reading output.

For calibration, the probe is moved exactly one inch and, in the calibration setting, the number of pulses formed by rotation of the graticule is directly read on to a read out scale. The scale is so arranged that this amount is shown with the decimal after the hundred position and if this number is greater than 24.00 it is necessary to calculate the multiplying factor which will cause it to be 24.00 and then the binary switch is set correctly, a second reading is taken of the pulse count after movement of the probe over one inch and, if the binary counter is correctly set, then the reading should then be 24.

Thus, the total pulses read must be at least 240 and less than 265 to be within the range of calibration.

In these circumstances, then, every movement of the propeller through an angle of 15° should cause movement of the probe by a distance which is proportional to the pitch of the propeller as 1:24 and a direct reading output can be taken.

In the foregoing and in broad generalisation, we have described what is the basic concept of the invention and a method of carrying it out.

Normally, the interrelationship between the angular rotation of the propeller and the movement of the probe is calculated automatically by a microprocessor circuit and the output is displayed directly by an LED or LCD output device.

In this general description we have indicated the pitch as being calculated over a 15° movement of a blade.

As we indicated earlier, it is quite conventional to measure the pitch over a greater angular displacement, such as 45° and we have found that it is quite convenient to incorporate a divider which can selectively divide the output pulse numbers by 1, 2, 3, 4, 5 and 24. The division by 1 provides a direct pitch output when the propeller is moved through 15°, by 2, 30°, by 3, 45° and so on. The division by 24 can be used to provide a direct reading, in inches, of the vertical movement of the probe.

The actual mathematical treatment is equivalent to the number of pulses multiplied by the setting of the binary switch, between 900 and 999, divided by 100, divided by the number of times 15° the propeller is rotated.

In some applications there is a preferment to measure the pitch over different angular movements, such as 9°, which gives 40 increments about the propeller. In order to obtain such an output it is only necessary to provide an alternative divider.

We can also provide an automatic reset so that continuing pitch readings after each required movement are calculated whilst, at the same time, we provide a total rotation since the last reset reading. Thus, should a reading start at the leading edge of a blade, with readings being taken at every 15°, there would be a first pitch reading at 15° which would be displayed, a first counter would be reset to 0 and a second counter maintain 15. After a second rotation through 15°, a second pitch reading would be displayed, the first counter would return to 0 and the second counter 30 and so on. Thus, it is possible to obtain pitch readings across the width of the blade.

It is also desired to reset both counters so that when a reading for a subsequent blade is to be taken, the reading starts at 0. In this case we provide a reset circuit which can be set and reset after 90°, 120° or 180° rotation.

It will be appreciated that for a four bladed propeller, the leading edges of the blades at the same radial position should be separated by exactly 90°, for a three bladed propeller 120° and for a two bladed propeller 180°. Thus, using such a reset the instrument would be initially set as the probe contacts the leading edge of the first blade, the required readings can be taken across the blade, reset will occur before readings commence on the next blade and so on.

This circuit can also have a set position at which no reset occurs. This position then reads the overall vertical movement of the probe and can be used as a means for calibration of the unit. The set position reads the incoming pulse number multiplied by the switch setting divided by one hundred and the output display is in inches. Then by moving the probe over a known height and at a known switch setting the correct switch setting can be calculated.

It will be appreciated that by varying the radial position of the probe so a profile of the propeller can be prepared simply.

It is also readily possible to use the two readings provided by the instrument, the angular rotation of the propeller about its axis and the vertical height displacement of the probe, to provide input information to a computer which can be programmed to provide a printed or video output of the pitch of the propeller in any required form.

Whilst in this specification we have, generally, referred to small propellers and the instrument for these can be basically a bench instrument, it is also possible to apply the invention to instruments which can be used to measure the pitch of propellers under different circumstances.

In the first of these the propeller can be in situ on the shaft, in which case it is necessary to affix to the propeller shaft a method of calculating the angular rotation of the propeller and to provide a probe which will remain in contact with the propeller blades. Of course, if the propeller has its axis substantially horizontal the probe may be loaded towards the propeller.

Figure 5:
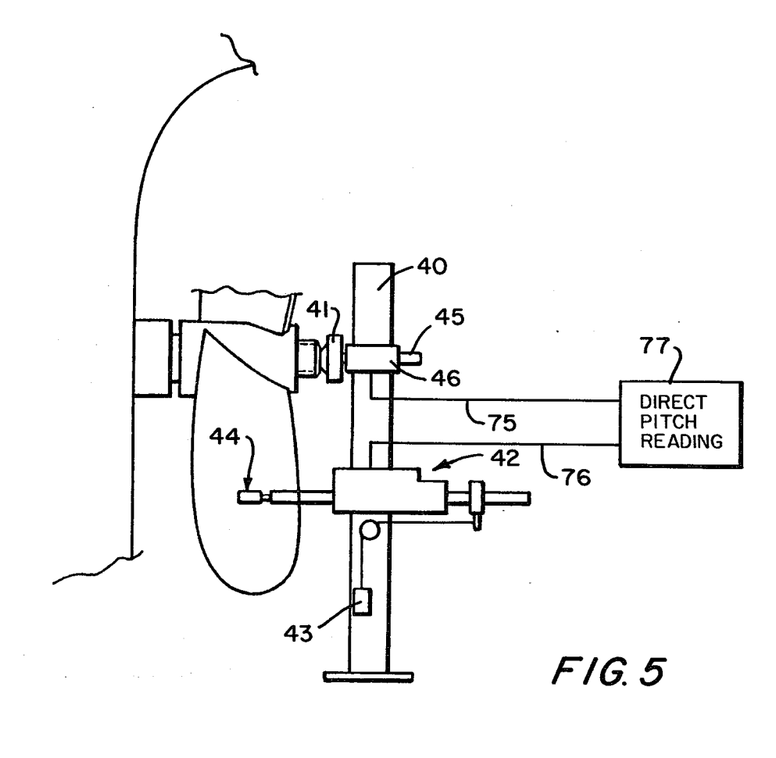
FIG. 5 is an illustrative view of a method of locating the instrument relative to a propeller which is still located on the propeller shaft of a ship.

One such arrangement is illustrated in the embodiment of FIG. 5, which is purely a schematic view, which shows one method whereby the instrument of the invention can be used to measure the pitch of a propeller which is still mounted on its propeller shaft. As previously indicated, propellers, particularly large propellers, can be extremely difficult to handle as often the stern of the vessel extends substantially beyond the propeller so it is not possible to simply place a crane in position to lift the propeller and, at the same time, once a propeller has been on a shaft for a substantial period, the shaft, propeller and key can become firmly locked and to break the contact between the components can, again, be very difficult.

Further, there can be difficulties, when replacing a propeller on a shaft, to ensure that the propeller is fully home on the taper of the shaft and properly located.

For these reasons it is most desirable to be able to check the pitch of the propeller with the propeller in position so as to avoid the necessity of removing the propeller unless this is essential, as for repair of the propeller.

In this form of the invention we may provide a frame 40, which, although not so illustrated, may be an A-frame, or which may be any other form of frame, which frame is adapted to be located so that a plane through the frame is normal to the axis of the propeller and to be firmly located in this position.

The frame is adjustable so that a registering means 41 can be correctly located as to be directly on the propeller axis to provide a datum point for radial measurement.

Associated with this regstering means may be a means whereby angular rotation of the propeller shaft, and thus the propeller, may be obtained.

In the illustrated form the registering means 41 may be rotatable with the propeller and has a shaft 45 which enters the housing 46. The shaft, within the housing 46 may be provided with a graticule and caliper similar to those illustrated in the earlier embodiment with the graticule having 360 lines and 360 spaces located therebetween about its periphery.

Alternatively, the registering means may be a recording device which is adapted to be operated by the periphery of the cone of the propeller or other means which can be calibrated on a first rotation of the propeller to provide a required angular output, as discussed in relation to the earlier embodiment.

Mounted on the frame and adapted for radial movement relative to the registering means there is a probe 42 which, basically, can be considered identical in concept to the probe 20 of the earlier embodiment. In the illustrated arrangement, the probe is provided with a counterweight 43 which holds the roller 44 of the probe against the propeller blade.

It will be seen that by adjusting the location of the probe 42 relative to the frame 40 an output can be obtained from an instrument of this form which is identical to the type of output referred to in relation to the previous embodiment and it can be manipulated in the same way as was the case with the previous embodiment.

It will be seen that when the probe tends to leave the trailing edge of a blade it would be forced to a fully inward position but, again, a limit means is provided so that the probe can be stopped at a rest position where it can pass on to the leading edge of the next adjacent blade.

In this particlar form of the invention, it may not be necessary to provide means, as part of the instrument, to effect rotation of the propeller as the ship may be provided with an inching means or the like whereby the propeller can be rotated or moved in a sequential manner, which would provide the movement necessary for the measurement provided by the invention to be effected.

It will be appreciated that the instrument of this embodiment can take widely varying physical forms within the basic criteria that the frame must be adjustable to be accurately at right angles to the shaft of the propeller and must be sufficiently rigid to prevent inaccuracies being produced in the measurement obtained from the probe.

This embodiment is also applicable in the case where the instrument is used for measuring the pitch of a propeller not only when it is still located on its propeller shaft but also when the ship is still in the water.

By making the probe 42 water proof and by water proofing the registering means 41, these can both be connected by umbilicals to the surface, which umbilicals supply power to operate the graticule or other lights and transmit the pulses received from the light sensitive devices to the surface, where the electronics of the instrument can be used to provide a required output from the signals so received.

In this embodiment, it may be necessary that the frame 40 is provided with means whereby it can be supported by the hull of the ship so as to be correctly located, but it will be appreciated that, although it might take quite some time for a diver to correctly locate the instrument, once it is located the actual measurements are taken in the same way as previously described and the cost of the operation, compared to dry docking the ship, is cheap.

Figure 6:
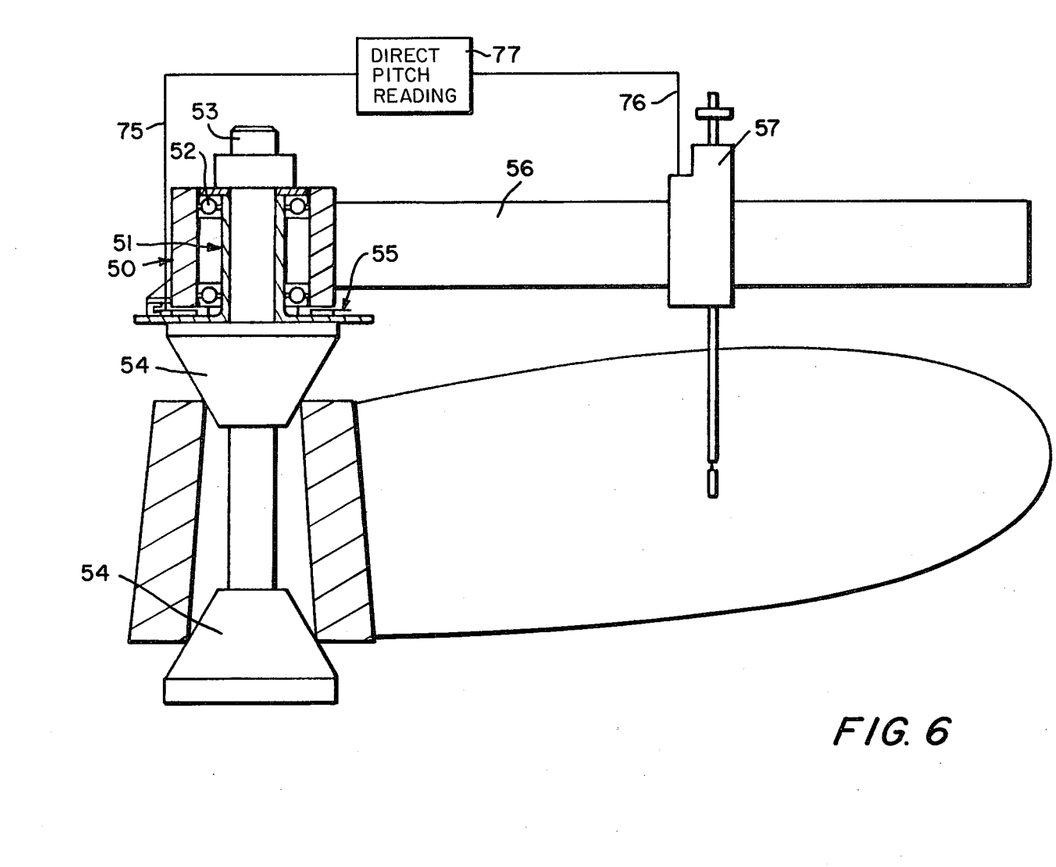
FIG. 6 is a view of a modified form of instrument which is adapted to be used on a propeller which is fixed against rotation.
Figure 7:
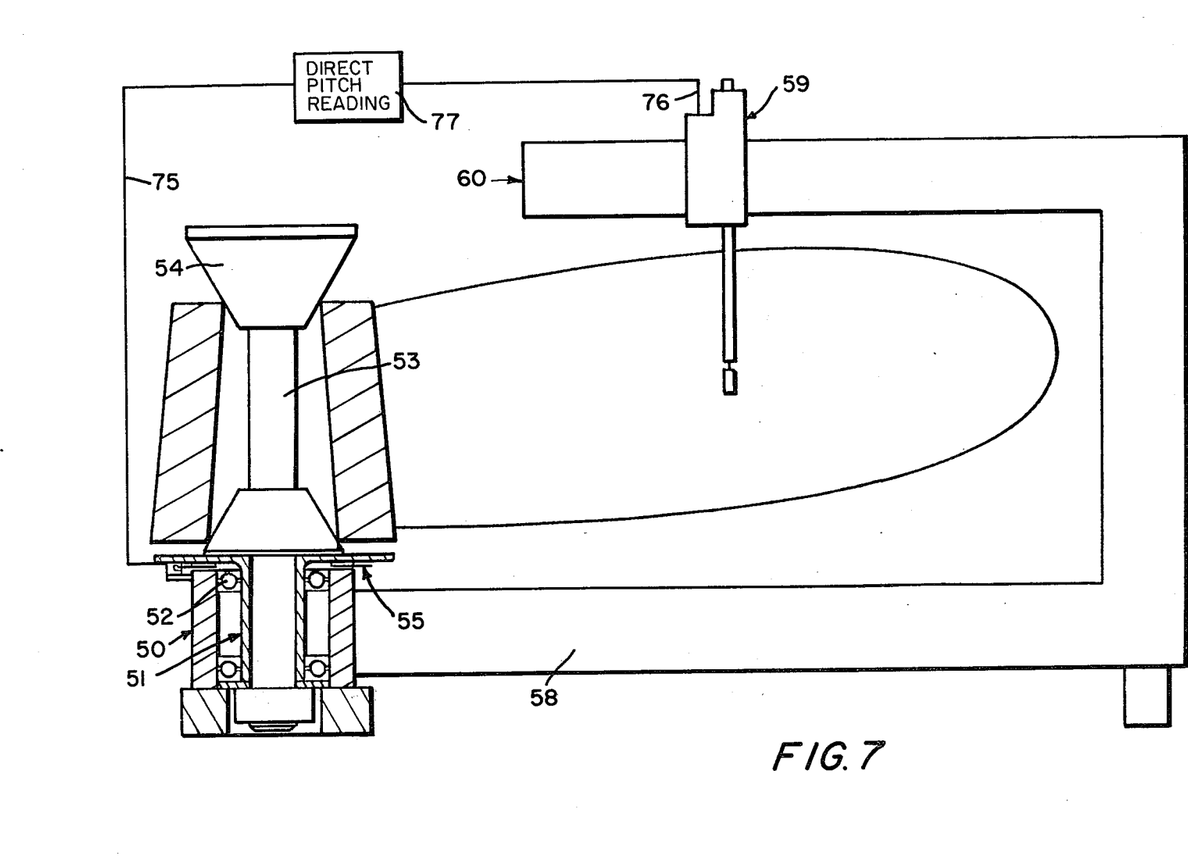
FIG. 7 is a view of the instrument of FIG. 6 showing the instrument being used in an inverted condition in which the propeller is mounted on the instrument and can be rotated thereon.

The embodiments of FIGS. 6 and 7 provides a dual purpose instrument which can be particularly useful in some applications. This form of the invention is useful where an initial check of the pitch of a propeller may need to be effected on, say, a wharf or the like and, if repairs or the like are necessary to the propeller later, checks may need to be made in a workshop.

We thus provide an instrument having a body 50 which may have a shaft 51 extending therethrough, the shaft 51 being journalled in thrust bearings 52, the shaft then being adapted to bear relatively high loads. The shaft may be arranged to be able to receive a spindle 53 which can pass through a propeller and be centralised by conical wedges or the like 54. Associated with the shaft 51 there may be a graticule 55 of the type described in relation to the earlier embodiments.

The body 50 may be able to detachably receive arms of two different types. The arm 56, illustrated in FIG. 6, may be adapted to receive a probe 57 which is mounted to be moveable therealong.

The arm 58, illustrated in FIG. 7, may be a U-shape arm which can receive a probe 59 moveably mounted on its free end 60.

It will be seen that where a propeller is to be checked, in situ, it is only necessary to locate the arm 56 on the body 50 and then locate the body so that the shaft 53 passes through the propeller bore and is centralised as by the conical wedges 54. The probe 57 is located at its required radial spacing and the arm 56 can be rotated about the propeller either by a motor drive associated with the body 50, manually or as otherwise required.

On the other hand, when the device is to be used in a workshop, the arm 58 is fitted, the propeller is fitted to the shaft 51 which shaft is rotated in the same way whilst the probe 59 at the required radial position contacts the propeller which rotates with the shaft 51. The body of the instrument remains fixed.

In a still further embodiment, illustrated in FIG. 3, and which is particularly suitable for extremely large propellers, we may prefer to provide a very heavy turntable comprised of two plates 70, 71, each of which may be provided with a annular or other shaped grooves 72, 73 in their facing surfaces, the grooves being of the same radial spacing, and bearings 74 located between the two plates and in the grooves. This will provide a turntable which can readily bear very heavy weights, can relatively easily be rotated and which can be moved at a relatively constant speed.

In this arrangement, a graticule 18 can be associated directly with the moving plate and be in association with a caliper 19 or, alternatively, any other means of measuring the degree of rotation of this plate can be provided.

It will be appreciated that with an arrangement such as this, a beam or the like can be located thereabove, which beam passes directly above the centre of rotation of the spindle 10 and can carry means whereby a probe can be positioned at various radial spacings outwardly from the centre.

We have previously herein indicated that we believe that the maintenance of a force on the probe whilst this is moving relative to the propeller aids in obtaining accurate and reproducable results as the movement of the probe is steady and any slack in the assembly is taken up and is basically held constant while movement occurs. This overcomes one of the difficulties which has occurred in previously proposed systems where the probe tends to skip relative to the surface of the propeller shaft, thus introducing errors in the point of location of the probe when readings are taken.

Further, in an arrangement where continuous readings are being fed into a computer, it is possible for the computer to monitor these readings and, if there is an obvious change in pitch between adjacent readings, so the computer can be programmed to take this into account as far as anticipated change in distortion of the probe is concerned and to compensate for the probe's theoretical position around the periphery of the probe.

Whilst we have described our invention particularly in relation to the measurement of pitch of propellers, it will be appreciated that the invention is equally applicable to other rotating pitched bodies, such as fans.

One particularly valuable application of the invention lies in the main circulatory fans of airconditioning systems. These fans are designed to move the amount of air theoretically needed throughout complex duct systems and it is usually necessary to tune these fans to the particular system after the fans have been placed in position.

Normally, the blades of the fans are so located as to be individually rotatable relative to the boss but, nevertheless, it has generally been found that to provide proper adjustment the fan needs to be positioned, tested, removed, adjusted and re-positioned until an optimum result is achieved.

In using the instrument of the present invention, each individual blade of the fan can be readily adjusted as to position to provide optimum working of the fan without the necessity of removal of the fan itself from its position, thus saving substantially in time and labour.

I claim:

1. An instrument for measuring the pitch of a propeller blade comprising:
   (a) a probe shaft mounted for axial movement;
   (b) means for maintaining the probe shaft in constant contact with the propeller blade at a fixed radial distance from the center of the blade;
   (c) means for providing continuous relative rotation between the probe shaft and the blade;
   (d) means for determining the amount of relative angular rotation between the blade and probe shaft;
   (e) means for determining the amount of axial movement of the probe shaft during the relative angular rotation; and
   (f) means for providing a direct reading of the pitch of the propeller blade at the radial distance at which the probe shaft is located and over the part of the blade traversed by the probe shaft based on the amount of relative angular rotation and the axial movement of the probe shaft.

2. An instrument as claimed in claim 1 wherein the instrument has a body, a rotatable spindle or the like extending from the body upon which a propeller may be mounted for rotation, drive means for the spindle whereby the propeller may be steadily rotated during measurement of the movement of the probe and means associated with the drive means whereby the amount of relative angular rotation can be determined.

3. An instrument as claimed in claim 2 wherein the drive means for the spindle comprises a motor and gear train.

4. An instrument as claimed in claim 1 wherein the means whereby the amount of relative rotation is determined includes a graticule rotated with or in a ratio to the rotation of the propeller blade which graticule has spaced transparent and dark bars, a caliper extending over the edge of the graticule and having a light source on one side thereof and a light sensitive device on the other side whereby light pulses are formed on rotation of the blade which light pulses can be counted and used to provide an analogue of the amount of rotation of the blade.

5. An instrument as claimed in claim 1 wherein the means whereby the amount of relative angular rotation is determined includes a disc rotated in a ratio of the rotation of the propeller blade, the disc having apertures therein, a light source on one side of the disc and a light sensitive device on the other side whereby light pulses are formed on rotation of the blade which light pulses can be counted and used to provide an analogue of the amount of rotation of the blade.

6. An instrument as claimed in claim 1 wherein the probe shaft passes through a housing and is journalled for axial movement relative thereto, a roller in the housing held against the probe shaft and caused to rotate on axial movement of the probe shaft, and means attached to the roller whereby the distance of movement of the probe shaft can be determined.

7. An instrument as claimed in claim 6 wherein the means attached to the roller is a graticule having alternate transparent and dark bars about its periphery, a light source on one side of the graticule and a light sensitive device on the other side whereby light pulses are formed on movement of the probe shaft, the number of pulses being proportional to the axial movement of the probe shaft which pulses are used in determining the movement of the probe.

8. An instrument as claimed in claim 1 for use when the propeller is still on its shaft comprising a frame adapted to be located relative to the propeller normal to the shaft, a registering means for contact with the shaft or propeller boss to locate the instrument for radial measurements and means associated with the registering means whereby the angular rotation of the propeller can be determined.

9. An instrument as claimed in claim 8 wherein the registering means is adapted to contact the centre of the propeller shaft and to give a direct reading of the rotation of the shaft.

10. An instrument as claimed in claim 8 in which the probe is biased to move inwardly.

11. An instrument as claimed in claim 1 including a body; means to centrally locate the body over the bore of a propeller, said means having bearings to allow the body to rotate relative to the propeller; an arm affixed to the body; and means attaching the probe shaft to the arm, whereby the propeller can be rotated relative to the body.

12. An instrument as claimed in claim 11 wherein the arm is generally "U" shaped, having one leg of the "U" extending outwardly from the body along one side of the blade and a second leg of the "U" extending on the opposite side of the blade, and means to attach the probe shaft to the second leg.

* * * * *